US011590690B2

(12) United States Patent
Kroes et al.

(10) Patent No.: US 11,590,690 B2
(45) Date of Patent: Feb. 28, 2023

(54) PRINTER UNIT FOR A 3D-PRINTING APPARATUS AND METHOD

(71) Applicant: SIGNIFY HOLDING B.V., Eindhoven (NL)

(72) Inventors: Hans Kroes, Olst (NL); Hendrik Jan Kettelarij, Eindhoven (NL); Peter Tjin Sjoe Kong Tsang, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 194 days.

(21) Appl. No.: 16/652,618

(22) PCT Filed: Oct. 2, 2018

(86) PCT No.: PCT/EP2018/076733
§ 371 (c)(1),
(2) Date: Mar. 31, 2020

(87) PCT Pub. No.: WO2019/068681
PCT Pub. Date: Apr. 11, 2019

(65) Prior Publication Data
US 2020/0238680 A1    Jul. 30, 2020

(30) Foreign Application Priority Data
Oct. 5, 2017    (EP) .................................... 17194899

(51) Int. Cl.
*B29C 64/118*    (2017.01)
*B29C 64/209*    (2017.01)
(Continued)

(52) U.S. Cl.
CPC ............ *B29C 64/118* (2017.08); *B33Y 10/00* (2014.12); *B29C 64/209* (2017.08); *B29C 64/393* (2017.08);
(Continued)

(58) Field of Classification Search
CPC ... B29C 64/118; B29C 64/209; B29C 64/393; B33Y 10/00; B33Y 30/00; B33Y 50/02; B33Y 70/00; B29K 2101/12
See application file for complete search history.

(56) References Cited

U.S. PATENT DOCUMENTS 6,085,957 A * 7/2000 Zinniel .................. B65H 63/08
226/8
10,201,503 B1 * 2/2019 Li ......................... B29C 64/295
(Continued)

FOREIGN PATENT DOCUMENTS

JP    H03-158228 A    7/1991
JP    2000-500709 A    1/2000
(Continued)

*Primary Examiner* — Joseph S Del Sole
*Assistant Examiner* — Baileigh Kate Darnell

(57) ABSTRACT

A printer unit (100) for a 3D-printing apparatus. The printer unit comprises a printer head (105) comprising a nozzle (110) arranged to deposit printing material from the printer unit, a pressure sensor (120) configured to sense a pressure exerted on the printer head from the printing material, and a control unit (130) coupled to the pressure sensor. The control unit is configured to control the speed of the printer head based on a transfer function from the pressure sensed by the pressure sensor to a desired speed of the printer head, in order to maintain a constant deposition of the amount of printing material per length unit of deposited printing material.

13 Claims, 3 Drawing Sheets

(51) Int. Cl.
    *B29C 64/393*     (2017.01)
    *B33Y 50/02*     (2015.01)
    *B33Y 10/00*     (2015.01)
    B33Y 30/00     (2015.01)
    B33Y 70/00     (2020.01)
    B29K 101/12     (2006.01)

(52) U.S. Cl.
    CPC ........... *B29K 2101/12* (2013.01); *B33Y 30/00* (2014.12); *B33Y 50/02* (2014.12); *B33Y 70/00* (2014.12)

(56) References Cited

U.S. PATENT DOCUMENTS

| | | |
|---|---|---|
| 2015/0097308 A1 | 4/2015 | Batchelder et al. |
| 2015/0266235 A1 | 9/2015 | Page |
| 2016/0031155 A1* | 2/2016 | Tyler .................. B29C 48/00 264/129 |
| 2017/0050382 A1 | 2/2017 | Minardi et al. |
| 2017/0120528 A1* | 5/2017 | Tejada Palacios .... B29C 64/112 |
| 2017/0165920 A1 | 6/2017 | Leavitt et al. |
| 2017/0252820 A1 | 9/2017 | Myerberg et al. |
| 2018/0015655 A1* | 1/2018 | Gheorghescu .......... B29C 48/18 |
| 2018/0056602 A1* | 3/2018 | Susnjara ................ B33Y 30/00 |
| 2018/0297272 A1* | 10/2018 | Preston ................ B29C 64/386 |
| 2019/0217546 A1* | 7/2019 | Bosveld ................ B33Y 10/00 |

FOREIGN PATENT DOCUMENTS

| | | |
|---|---|---|
| WO | 2014153535 A2 | 9/2014 |
| WO | 2016082036 A1 | 6/2016 |
| WO | 2017108208 A1 | 6/2017 |

\* cited by examiner

PRINTER UNIT FOR A 3D-PRINTING APPARATUS AND METHOD

CROSS-REFERENCE TO PRIOR APPLICATIONS

This application is the U.S. National Phase application under 35 U.S.C. § 371 of International Application No. PCT/EP2018/076733, filed on Oct. 2, 2018, which claims the benefit of European Patent Application No. 17194899.5, filed on Oct. 5, 2017. These applications are hereby incorporated by reference herein.

FIELD OF THE INVENTION

The present invention generally relates to the field of 3D printing. More specifically, the present invention relates to a printer unit for a 3D printing apparatus, and a printing method.

BACKGROUND OF THE INVENTION

Additive manufacturing, sometimes also referred to as 3D printing, refers to processes used to synthesize a three-dimensional object. 3D printing is rapidly gaining popularity because of its ability to perform rapid prototyping without the need for assembly or molding techniques to form the desired article.

By using a 3D-printing apparatus, an article or object may be built in three dimensions in a number of printing steps that often are controlled by a computer model. For example, a sliced 3D model of the object may be provided in which each slice is recreated by the 3D printing apparatus in a discrete printing step.

One of the most widely used 3D-printing processes is Fused Filament Fabrication (FFF). FFF printers often use a thermoplastic filament which in its molten state is ejected from a nozzle of the printer. The material is then placed layer by layer, to create a three-dimensional object. FFF printers are relatively fast and can be used for printing objects of various kinds, even those having relatively complex structures.

During 3D-printing, it is desirable to provide an adequate adherence of the printing material to the underlying material, and that the deposited layer of printing material has a predictable layer thickness and layer width. As a consequence, the deposited layer may be provided as a relatively smooth, homogeneous surface.

It will be appreciated that variations of the pressure of the molten material inside the printing nozzle may lead to defects and/or aesthetic deficiencies in the FDM 3D-printed products. Examples of these defects or deficiencies may be material surface roughnesses, undulations, irregularities, or the like. In the prior art, there is suggested a method to measure the nozzle pressure and trying to control the feeding rate of the printing material to try to keep a relatively constant pressure which the printing material exerts on the nozzle. However, it should be noted that an arrangement of this kind requires a relatively circumstantial control arrangement, since corrections of the feeding rate immediately influences the mentioned pressure.

Hence, alternative solutions are of interest, which are able to deposit one or more layers of printing material, resulting in a relatively smooth, homogeneous layer surface.

SUMMARY OF THE INVENTION

It is an object of the present invention to mitigate the above problems and to provide a printer unit and a method which are able to deposit one or more layers of printing material with a desired layer thickness and layer width, resulting in a relatively smooth, homogeneous layer surface.

This and other objects are achieved by providing a printer unit and a method having the features in the independent claims. Preferred embodiments are defined in the dependent claims.

Hence, according to a first aspect of the present invention, there is provided a printer unit for a 3D-printing apparatus. The printer unit comprises a printer head comprising a nozzle arranged to deposit printing material from the printer unit. The printer unit further comprises a pressure sensor configured to sense a pressure exerted on the printer head from the printing material. Moreover, the printer unit comprises a control unit coupled to the pressure sensor, wherein the control unit is configured to control the speed of the printer head based on a transfer function from the pressure sensed by the pressure sensor to a desired speed of the printer head, in order to maintain a constant deposition of the amount of printing material per length unit of deposited printing material. The transfer function is an increasing function so that when a pressure increase is detected, the printing speed will be increased according to a predefined correlation, and vice versa.

According to a second aspect of the present invention, there is provided a method for 3D-printing an object by a printer unit comprising a printer head comprising a nozzle arranged to deposit printing material from the printer unit. The method comprises the step of sensing a pressure exerted on the printer head from the printing material. The method further comprises the step of controlling the speed of the printer head based on a transfer function from the pressure sensed by the pressure sensor to a desired speed of the printer head, in order to maintain a constant deposition of the amount of printing material per length unit of deposited printing material. The transfer function is an increasing function so that when a pressure increase is detected, the printing speed will be increased according to a predefined correlation, and vice versa.

Thus, the present invention is based on the idea of providing a printer unit for a 3D-printing apparatus which is configured to deposit a printing material to generate a 3D-printed object having a relatively homogeneous surface that is smooth over a relatively large area. This may be achieved by controlling the speed of the printer head during operation of the printer unit with the purpose of depositing a (relatively) constant amount of printing material per length unit of deposited printing material. The speed of the printer head is controlled based on an increasing transfer or correlation function between a pressure (measured or estimated) of the printer head (e.g. the printer nozzle of the printer head) and a desired speed of the printer head. A function $y=f(x)$ is increasing if $f(x_1) \leq f(x_2)$ when $x_1 < x_2$, for any combination of $x_1$ and $x_2$. The present invention is advantageous in that the concept of ensuring a (relatively) constant material deposition by controlling the printing speed of the printer unit as a function of the pressure exerted on the printer head from the printing material is significantly more efficient compared to arrangements in the prior art. Notably, the present invention may avoid a control of the feeding rate of the printing material as a function of the pressure which the printing material exerts on the nozzle. Consequently, relatively complex feedback control systems may hereby be avoided, and a much more efficient feed-forward system may be sufficient to provide desired surface properties of a 3D-printed product.

The printing material provided to the printer head is usually formed as a cylinder-shaped filament. It should be noted, however, that the diameter of the filament may vary along the length of the filament, especially in case printing material of lower quality is used. Hence, the volume of the printing material supplied to the printer head may vary quite significantly, considering that the volume of the printing material per unit length in the form of a filament is a function of the radius squared. Consequently, this may lead to relatively large variations in pressure exerted on the printer head from the printing material. The present invention is advantageous in that it may compensate for pressure variations of this kind by controlling the speed of the printer head accordingly.

It will be appreciated that the mentioned advantages of the printer unit of the first aspect of the present invention also hold for the method according to the second aspect of the present invention.

The printer unit of the present invention comprises a printer head comprising a nozzle arranged to deposit printing material from the printer unit. The printer unit further comprises a pressure sensor configured to sense a pressure exerted on the printer head from the printing material. By the term "pressure sensor", it is here meant substantially any sensor, measuring device, or the like, for measuring the pressure or force. Moreover, the printer unit comprises a control unit coupled to the pressure sensor. By "control unit", it is here meant substantially any unit, device, or the like, for control purposes. The control unit is configured to control the speed of the printer head. By the term "speed of the printer head", it is hereby meant the linear speed of the printer head during operation of the printer unit, i.e. during deposition of printing material by means of the printer unit. The control unit is configured to control the speed of the printer head based on a transfer function from the pressure sensed by the pressure sensor to a desired speed of the printer head. By the term "transfer function", it is here meant a mapping or correlation function. The speed of the printer head is hereby controlled in order to maintain a (relatively) constant deposition of the amount of printing material per length unit of deposited printing material. The transfer function is an increasing function so that when a pressure increase is detected, the printing speed will be increased according to a predefined correlation, and vice versa.

According to an embodiment of the present invention, the printer unit further comprises a feeding unit configured to feed printing material. The pressure sensor is coupled to the feeding unit and configured to sense a pressure exerted on the feeding unit from the printing material. The present embodiment is advantageous in that a (direct) measurement of the pressure from the printing material in or near the nozzle may be avoided. This may be beneficial in some cases, as such a measurement may be circumstantial, complex and/or inconvenient, especially when considering that the nozzle may be relatively hot. However, in some cases, it may be preferable to (directly) sense a pressure exerted on the nozzle from the printing material by providing a coupling of the pressure sensor to the nozzle.

According to an embodiment of the present invention, the transfer function comprises at least one filter function between the pressure sensed by the pressure sensor and the desired speed of the printer head. The present embodiment is advantageous in that the filter function may even further improve the transfer function, which consequently may generate an even more improved speed of the printer head during operation in order to maintain a constant deposition of the amount of printing material per length unit of deposited printing material.

According to an embodiment of the present invention, at least one filter function is selected from a list comprising a delay function, an averaging function, a scaling function, and a non-linear function. By the term "delay function", it is here meant a delay, pause, interval, or the like in the correlation between the pressure sensed by the pressure sensor to a desired speed of the printer head. By the term "averaging function", it is here meant that data of the pressure sensed by the pressure sensor may be averaged before providing the correlation to the desired speed of the printer head. By the term "scaling function", it is here meant that a change of the pressure sensed by the pressure sensor by a factor changes the desired speed of the printer head by the same factor. By the term "non-linear function", it is here meant e.g. an offset, exponential term, logarithmic function, etc. The present embodiment is advantageous in that the mentioned filter function(s) may contribute to an even further improved transfer function, with the purpose of generating an even more improved speed of the printer head during operation.

According to an embodiment of the present invention, the transfer function is determined based on at least one parameter selected from a list comprising a speed of the printer head, a temperature of the nozzle, a feeding rate of printing material, and an amount of printing material deposited per length unit of deposited printing material. It will be appreciated that one or more of the mentioned features may have an impact on the deposition of printing material by the printer head during operation of the printer unit. Hence, by providing a transfer function from the pressure sensed by the pressure sensor to a desired speed of the printer head based on one or more of the mentioned parameters, an even more customized speed of the printer head may be achieved in order to maintain a constant deposition of the amount of printing material per length unit of deposited printing material.

According to an embodiment of the present invention, the printer unit further comprises a measuring device configured to measure at least one parameter selected from a list comprising a speed of the printer head, a temperature of the nozzle, a feeding rate of printing material, and an amount of printing material deposited per length unit of deposited printing material.

According to an embodiment of the present invention, the transfer function is predefined. In other words, the transfer function is determined (set) in advance. It will be appreciated that the transfer function may be determined based on simulations, empirical data and/or theory. The present embodiment is advantageous in that a provision of a predetermined or predefined transfer function may avoid additional measurements, thereby conveniently providing a transfer function from the pressure sensed by the pressure sensor to a desired speed of the printer head.

According to an embodiment of the present invention, the control unit is configured to interrupt an operation of the printer unit in case the speed of the printer head is outside a predetermined interval. The present embodiment is advantageous in that the limited speed may counteract defects and/or aesthetic deficiencies in the 3D-printed objects, in case of a too low or too high speed of the printer head. The present embodiment is advantageous in that potential damages of the printer unit may be avoided, e.g. in case of a too high printer head speed.

According to an embodiment of the present invention, the printer unit further comprises a feeding unit configured to feed printing material, and the method according to the second aspect of the present invention may further comprise the step of sensing a pressure exerted on the feeding unit from the printing material.

According to an embodiment of the present invention, the method further comprises the step of sensing a pressure exerted on the nozzle from the printing material.

According to an embodiment of the present invention, the method further comprises interrupting an operation of the printer unit in case the speed of the printer head is outside a predetermined interval.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
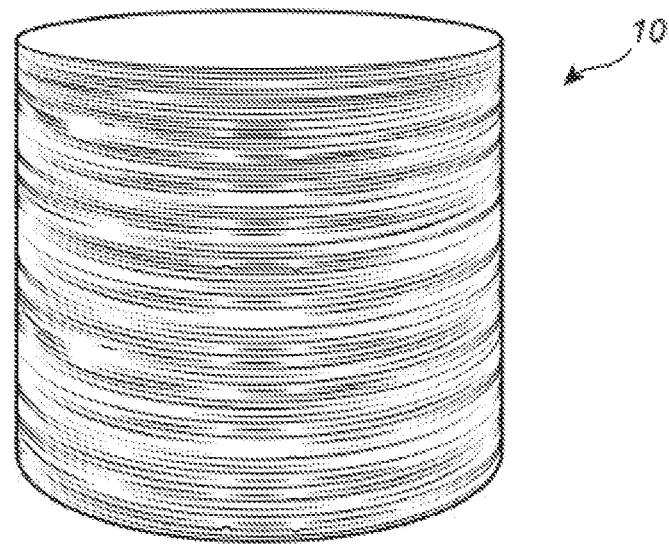
FIG. 1a shows a schematic view of a 3D-printed object which has been printed by a 3D-printing apparatus according to the prior art.

FIG. 1a shows a schematic view of a 3D-printed object 10 which has been printed by a 3D-printing apparatus according to the prior art. It will be appreciated that the surface of the object 10 discloses significant roughnesses, undulations and irregularities, and these defects or deficiencies are due to variations of the pressure of the molten material inside the printing nozzle of the 3D-printing apparatus. According to the prior art, there is suggested a method to measure the nozzle pressure and trying to control the feeding rate of the printing material to try to keep a relatively constant pressure which the printing material exerts on the nozzle. However, alternative solutions are of interest, which are able to provide an even higher printing quality of a 3D-printed object.

Figure 1B:
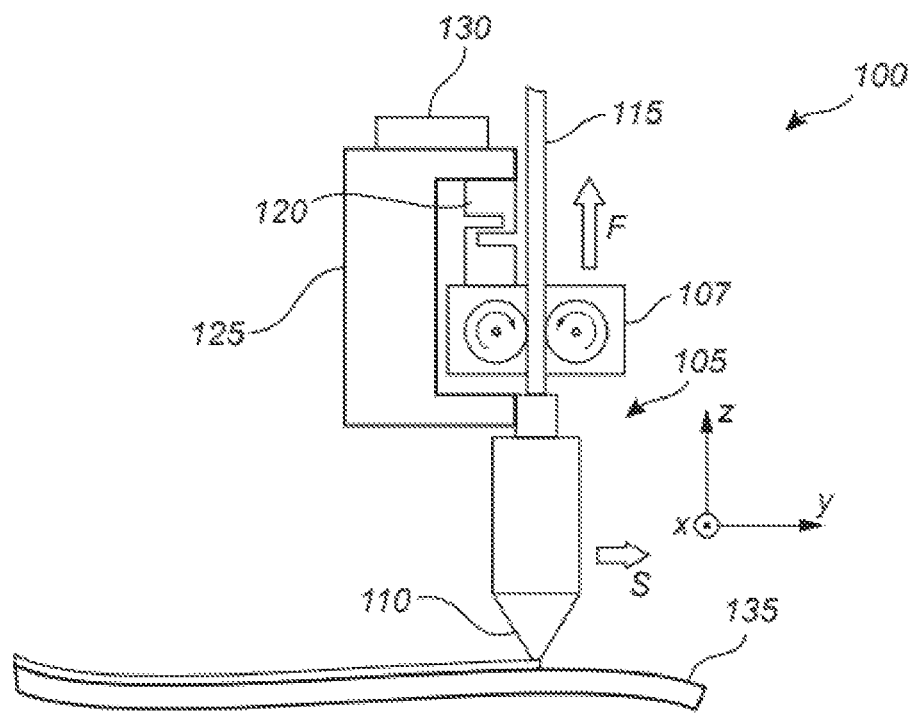
FIG. 1b is a schematic view of a printer unit for a 3D-printing apparatus according to an exemplifying embodiment of the present invention.

FIG. 1b shows a schematic view of a printer unit 100 for a 3D-printing apparatus. It will be appreciated that the printer unit 100 may comprise additional elements, features, etc. However, these are omitted in FIG. 1b for an increased understanding. The printer unit 100 comprises a printer head 105 which in turn comprises a nozzle 110 and a feeding unit 107. The nozzle 110 is arranged to deposit printing material supplied to the nozzle 110 by the feeding unit 107. During operation of the printer unit 100, the printer head 105 moves with a speed S (indicated to the right in FIG. 1b) during deposition of printing material.

In this example, the nozzle 110 is arranged to deposit printing material in the form of a filament 115 in a vertical direction and on an underlying material 135. The underlying material 135 is exemplified as a slightly undulated build-plate, but may alternatively constitute at least one layer of (previously deposited) printing material. The printing material is extruded from the bottom portion of the tapered nozzle 110. To be able to create a relatively smooth surface of layer(s) of printing material, the first layer of printing material is normally printed with a relatively small layer thickness of 0.1-0.2 mm.

The printer unit 100 comprises a pressure sensor 120, which is schematically indicated in FIG. 1b. The pressure sensor 120 of the printer unit 100 is configured to sense a pressure exerted on the printer head 105 from the printing material, e.g. as described in the following. The pressure sensor 120 may be configured to sense a pressure resulting from a force F exerted on the feeding unit 107 of the printer head 105 from the printing material, which may be explained by the following: during an operation of a 3D-printing apparatus comprising a printer unit 100 according to the depicted example of the invention, printing material deposited upon the underlying material 135 from the printer unit nozzle 110 may push printing material backwards (i.e. in the z-direction) within the printer unit 100 against the printing material feed direction (i.e. the negative z-direction). Consequently, the printing material imparts an (upwards) force F in the z-direction on the feeding unit 107 which pushes the feeding unit 107 away from the nozzle 110. The pressure exerted on the feeding unit 107 from the printing material, resulting from the force F, may hereby be measured by the pressure sensor 120. Alternatively, the pressure sensor 120 may be coupled to the nozzle 110 and configured to sense a pressure exerted on the nozzle 110 from the printing material.

The printer unit 100 further comprises a control unit 130 which is schematically indicated in FIG. 1b. The printer unit 100 is coupled to the pressure sensor 120, wherein the control unit 130 is configured to control the speed S of the printer head 105. The speed S is based on a transfer function f from a pressure $P_s$ sensed by the pressure sensor 120 to a desired speed $S_d$ of the printer head 105, with the purpose of maintaining a constant deposition of the amount of printing material per length unit of deposited printing material.

Figure 2:
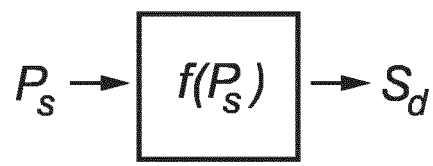
FIG. 2 is a schematic view of a transfer function according to an exemplifying embodiment of the present invention.

FIG. 2 is a schematic illustration of a transfer function f according to an embodiment of the present invention. The transfer function f may be interpreted as a transfer or mapping function f from the pressure $P_s$ sensed by the pressure sensor 120 to the desired speed $S_d$ of the printer head 105, i.e. $f(P_s)=S_d$.

Figure 3A:
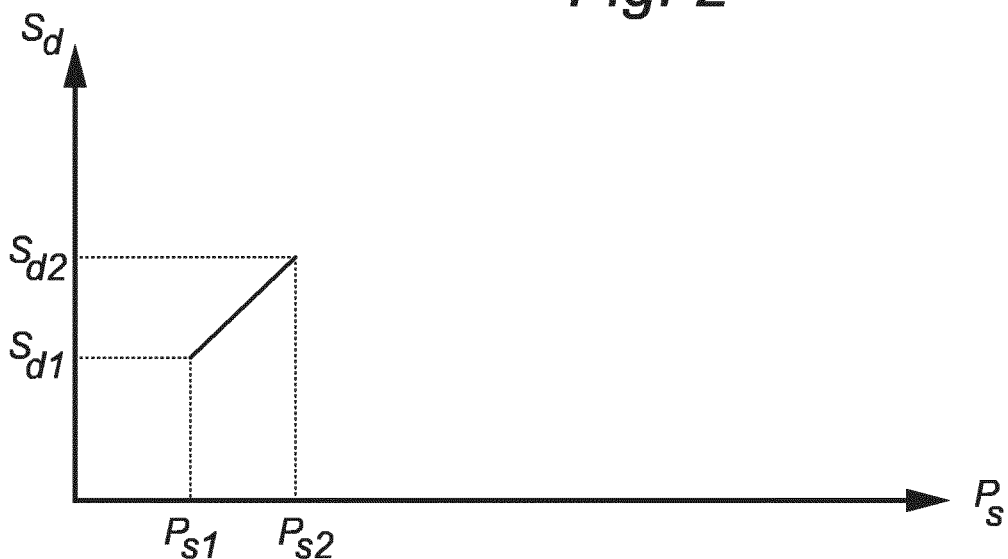
FIGS. 3a-b are schematic illustrations of transfer functions according to exemplifying embodiments of the present invention.
Figure 3B:
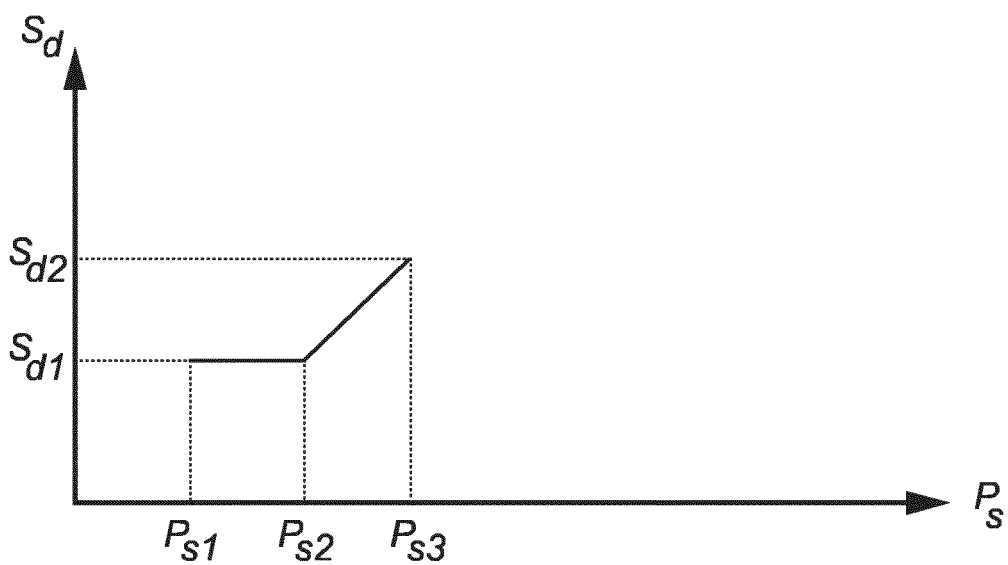

FIGS. 3a-b are schematic illustrations of increasing transfer functions according to exemplifying embodiments of the present invention. It should be noted that the figures are not drawn to scale, and are merely shown as examples. In FIG. 3a, the transfer function f may correspond to a linear function which sets or determines the desired speed $S_d$ of the printer head linearly to the sensed pressure $P_s$. For example, in case of a linear transfer function f, a change in the pressure $P_s$ from $P_{s1}$ to $P_{s2}$ as indicated in FIG. 3a may results in a change of the desired speed $S_d$ from $S_{d1}$ to $S_{d2}$. For example, the function f may be expressed as $S_d=f(P_s)=k*P_s+m$, wherein k is a scaling factor. For example, the scaling factor k may be selected to be 0.5<k<1. Alternatively, the transfer function may comprise at least one filter function between the pressure $P_s$ sensed by the pressure sensor and the desired speed $S_d$ of the printer head. In FIG. 3b, the filter function f comprises a delay function such that $S_d$ remains unchanged even though the pressure $P_s$ changes from $P_{s1}$ to $P_{s2}$. Then, if there is an increase of the pressure $P_s$ from $P_{s2}$ to $P_{s3}$, the desired speed $S_d$ changes from $S_{d1}$ to $S_{d2}$. It will be appreciated that the transfer function f may comprise other functions which are not exemplified in the figures. For example, the filter function may further comprise an averaging function, whereby data of the pressure $P_s$ is filtered and/or averaged over several measurements. This may be beneficial for a removal of short and/or long-term pressure effects. As yet another alternative, the filter function may further comprise one or more non-linear functions (e.g. comprising one or more offsets, exponential terms, logarithmic functions, etc.)

Moreover, the transfer function may be determined based on other parameters. For example, the speed of the printer head, the temperature of the nozzle, the feeding rate of printing material, the amount of printing material deposited per length unit, etc. may influence the transfer function. For example, the transfer function may generate a higher desired speed $S_d$ in case the feeding rate of printing material increases and/or the temperature of the nozzle increases.

Figure 4:
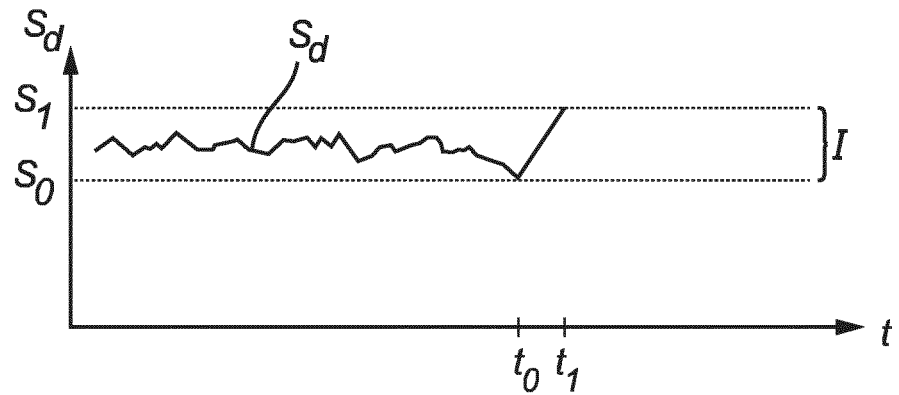
FIG. 4 is a schematic view of a 3D-printing arrangement according to an embodiment of the present invention.

FIG. 4 is a schematic diagram of a desired speed $S_d$ of the printer head as a function of time t during an operation of the printer unit. The control unit of the printer unit may be configured to set or provide a predetermined interval I of the desired speed $S_d$, wherein the interval I is defined between a lower boundary $S_0$ and an upper boundary $S_1$, i.e. $S_0 \leq S_d \leq S_1$. During a first period of the operation of the printer unit, at a left hand side of the diagram in FIG. 4, the desired speed $S_d$ is found within the predetermined interval I. During this condition of the operation of the printer unit, the printer unit may be configured to maintain its printing operation. However, the printer unit may be configured to interrupt its operation in case the desired speed $S_d$ is outside the predetermined interval I. This is exemplified in FIG. 4 at time $t_1$, wherein the desired speed $S_d$ is outside the predetermined interval I (i.e. $S_d > S_1$). It should be noted that FIG. 4 is not drawn to scale, and that $S_d$ is shown only as an example. Furthermore, the predetermined interval I is also provided as an example, and may be defined differently. For example, the predetermined interval I may be wider or more narrow than that indicated.

Figure 5:
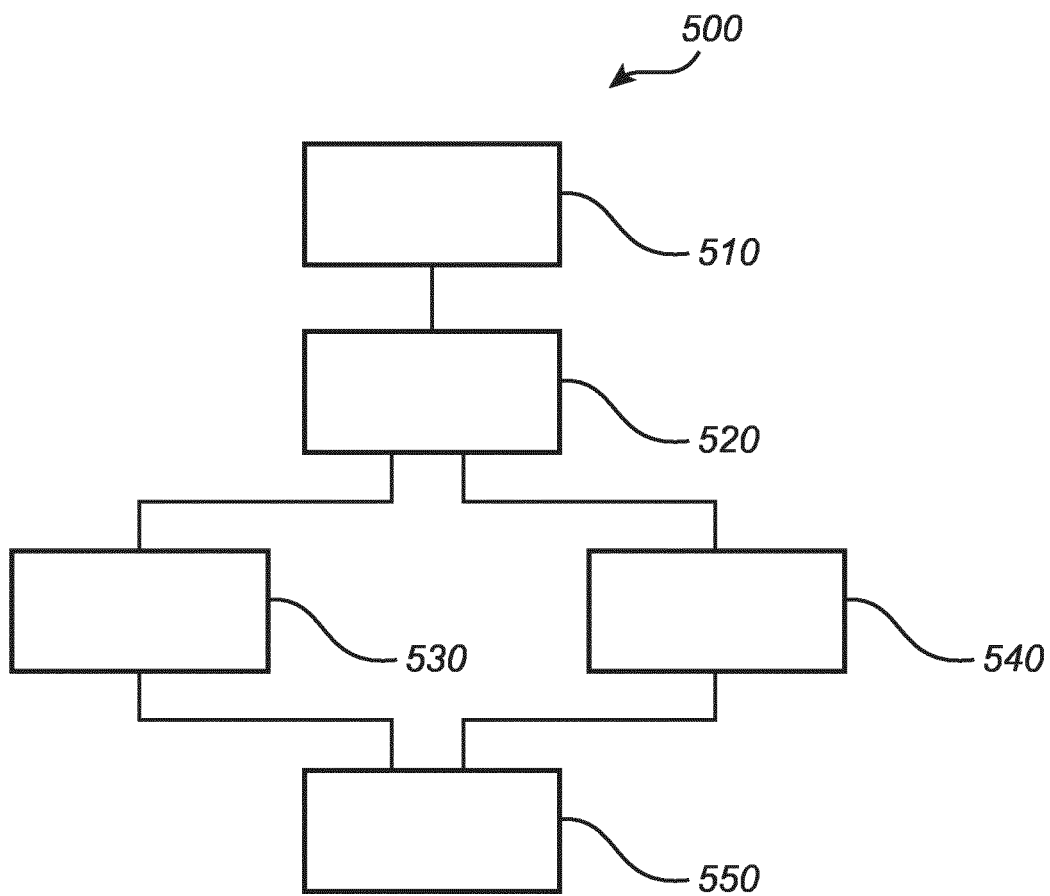
FIG. 5 is a schematic view of a method according to an exemplifying embodiment of the present invention.

FIG. 5 is a method 500 for 3D-printing an object by a printer unit comprising a printer head arranged to deposit printing material from the printer unit. The method 500 comprises the step of sensing 510 a pressure exerted on the printer head from the printing material. Furthermore, the method 500 comprises the step of controlling 520 the speed of the printer head based on a transfer function from the pressure sensed by the pressure sensor to a desired speed of the printer head, in order to maintain a constant deposition of the amount of printing material per length unit of deposited printing material.

In case the printer unit further comprises a feeding unit configured to feed printing material, according to a previously described embodiment, the method 500 may optionally comprise the further step of sensing 530 a pressure exerted on the feeding unit from the printing material. Alternatively, the method 500 may comprise the step of sensing 540 a pressure exerted on the nozzle from the printing material.

The method 500 may optionally comprise the further step of interrupting 550 an operation of the printer unit in case the speed of the printer head is outside a predetermined interval.

The person skilled in the art realizes that the present invention by no means is limited to the preferred embodiments described above. On the contrary, many modifications and variations are possible within the scope of the appended claims. For example, it will be appreciated that the figures are merely schematic views of printer units according to embodiments of the present invention. Hence, any elements/components of the printer unit 100 such as the printer head 105, the nozzle 110, the feeding unit 107, etc., may have different dimensions, shapes and/or sizes than those depicted and/or described. For example, the printer head 105, the nozzle 110 and/or the feeding unit 107 may be larger or smaller than what is exemplified in the figures.

The invention claimed is:

1. A printer unit for a 3D-printing apparatus, comprising
    a printer head comprising a nozzle arranged to deposit printing material from the printer unit onto an underlying material, wherein during deposition of the printing material, said printer head moves with a movement speed S relative to the underlying material
    a pressure sensor configured to sense a pressure $P_s$ exerted on the printer head from the printing material, and
    a control unit coupled to the pressure sensor, wherein the control unit is configured to control the movement speed S of the printer head based on an increasing transfer function f from the pressure sensed $P_s$ by the pressure sensor to a desired movement speed $S_d$ of the printer head, in order to maintain a relatively constant deposition of the amount of printing material per length unit of deposited printing material.

2. The printer unit according to claim 1, further comprising a feeding unit configured to feed printing material, wherein the pressure sensor is coupled to the feeding unit and configured to sense a pressure exerted on the feeding unit from the printing material.

3. The printer unit according to claim 1, wherein the pressure sensor is coupled to the nozzle and configured to sense a pressure exerted on the nozzle from the printing material.

4. The printer unit according to claim 1, wherein the transfer function comprises at least one filter function between the pressure sensed $P_s$ by the pressure sensor and the desired movement speed $S_d$ of the printer head.

5. The printer unit according to claim 4, wherein the at least one filter function is selected from a list comprising a delay function, an averaging function, a scaling function, and a non-linear function.

6. The printer unit according to claim 1, wherein the transfer function is determined based on at least one parameter selected from a list comprising a movement speed of the printer head, a temperature of the nozzle, a feeding rate of the printing material, and an amount of printing material deposited per length unit of deposited printing material.

7. The printer unit according to claim 6, further comprising a measuring device configured to measure at least one parameter selected from a list comprising a movement speed of the printer head, a temperature of the nozzle, a feeding rate of the printing material, and an amount of printing material deposited per length unit of deposited printing material.

8. The printer unit according to claim 1, wherein the transfer function is predefined.

9. The printer unit according to claim 1, wherein the control unit is configured to interrupt an operation of the printer unit in case the movement speed of the printer head is outside a predetermined interval.

10. A method for 3D-printing an object by a printer unit comprising a printer head comprising a nozzle arranged to deposit printing material from the printer unit onto an underlying material, wherein during deposition of the printing material, said printer head moves with a movement speed S relative to the underlying material; said method comprising the steps of:

sensing a pressure exerted on the printer head from the printing material, and controlling the movement speed S of the printer head based on an increasing transfer function from the pressure sensed by the pressure sensor to a desired movement speed of the printer head, in order to maintain a relatively constant deposition of the amount of printing material per length unit of deposited printing material.

11. The method according to claim 10, wherein the printer unit further comprises a feeding unit configured to feed printing material, and wherein the method further comprises the step of sensing a pressure exerted on the feeding unit from the printing material.

12. The method according to claim 10, further comprising the step of sensing a pressure exerted on the nozzle from the printing material.

13. The method according to claim 10, further comprising interrupting an operation of the printer unit in case the movement speed of the printer head is outside a predetermined interval.

* * * * *